US008682834B2

(12) United States Patent
Nakamura

(10) Patent No.: US 8,682,834 B2
(45) Date of Patent: Mar. 25, 2014

(54) INFORMATION PROCESSING APPARATUS AND INFORMATION PROCESSING METHOD

(75) Inventor: Yasufumi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 13/205,893

(22) Filed: Aug. 9, 2011

(65) Prior Publication Data

US 2012/0041919 A1  Feb. 16, 2012

(30) Foreign Application Priority Data

Aug. 10, 2010  (JP) ................................ 2010-179251

(51) Int. Cl.
*G06F 17/00* (2006.01)
*G06N 5/02* (2006.01)
*G06K 9/00* (2006.01)

(52) U.S. Cl.
USPC .............................. 706/50; 382/118; 382/229

(58) Field of Classification Search
USPC ..................... 706/50; 382/118, 229
See application file for complete search history.

(56) References Cited

U.S. PATENT DOCUMENTS

2004/0201751 A1* 10/2004 Bell et al. ................. 348/231.99
2005/0280720 A1* 12/2005 Kwon et al. ............... 348/231.3
2006/0274949 A1* 12/2006 Gallagher et al. ............ 382/228
2007/0211160 A1*  9/2007 Katayama et al. ....... 348/333.05
2009/0046933 A1*  2/2009 Gallagher et al. ............ 382/224

FOREIGN PATENT DOCUMENTS

JP   2004-357145 A   12/2004
JP   2005-260441 A    9/2005
JP   2008-278351 A   11/2008

OTHER PUBLICATIONS

Xia, Shuangrong, et al. "Context-Aware Image Annotation and Retrieval on Mobile Device." Multimedia and Information Technology (MMIT), 2010 Second International Conference on. vol. 1. IEEE, 2010.*
Blythe, Paul, and Jessica Fridrich. "Secure digital camera." Proceedings of Digital Forensic Research Workshop. 2004.*

* cited by examiner

*Primary Examiner* — Jeffrey A Gaffin
*Assistant Examiner* — James F Sugent
(74) *Attorney, Agent, or Firm* — Fujitsu Patent Center

(57) ABSTRACT

An information processing apparatus includes, a first database in which an imaging device is previously associated with an owner of the imaging device among a plurality of persons, a second database in which the persons are previously associated with their respective personal images, a first determining unit to acquire information about the imaging device associated with an image of interest to be served as an object to be estimated as a photographer, a second determining unit to acquire a second value that represents a probability that each of persons is a photographer of the image of interest, based on a result of making a comparison between a subject image included in the image of interest and each personal image in the second database, and a third determining unit to acquire a third value that represents a probability that each of persons is a photographer of the image of interest.

8 Claims, 15 Drawing Sheets

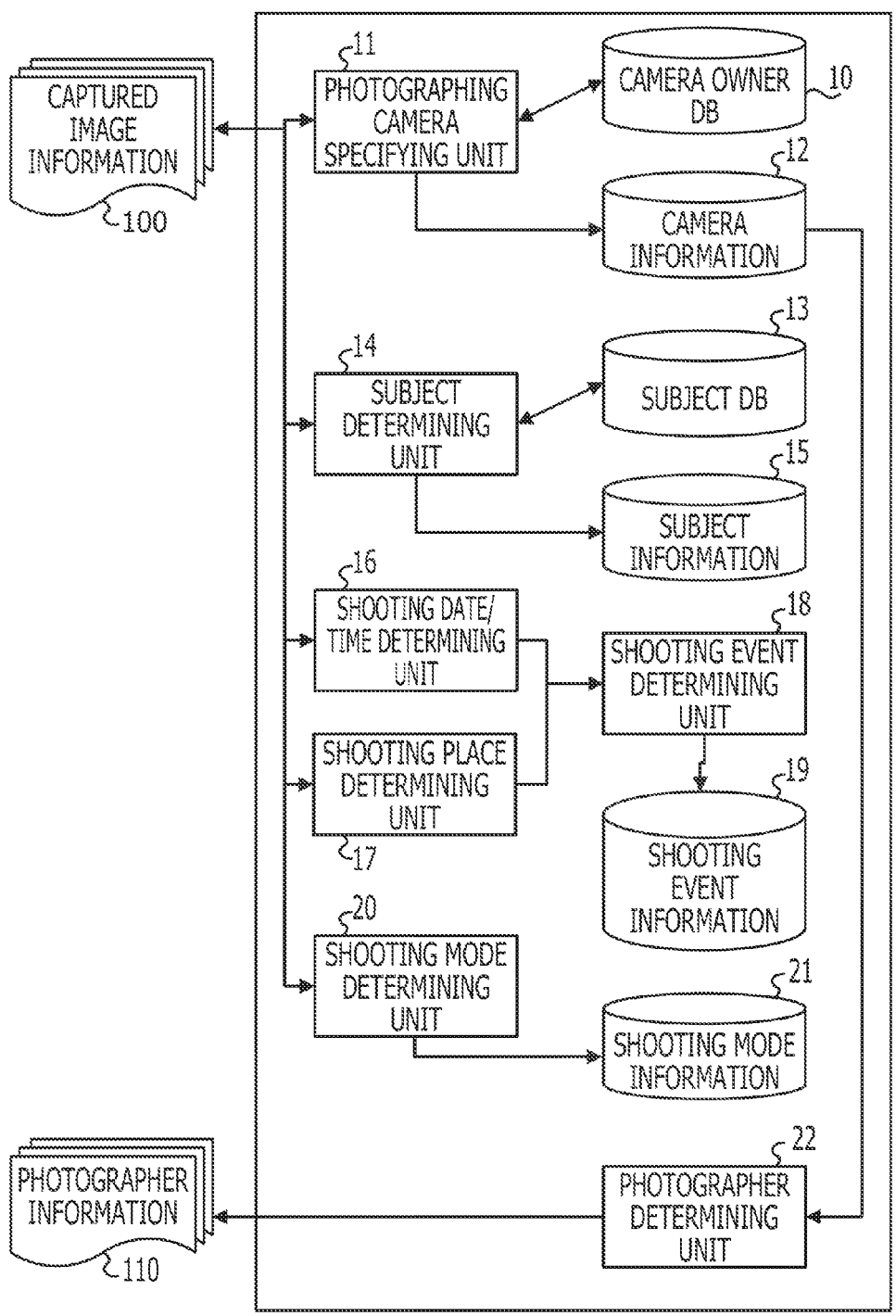

FIG. 2

| FILE INDEX | FILE NAME | IMAGE ATTRIBUTE | CAMERA ID | SHOOTING DATE/TIME | SHOOTING PLACE | SHOOTING MODE INFORMATION |
|---|---|---|---|---|---|---|
| 1 | Photo000.jpg | P | CAMERA A | 2010/3/31 10:00:24 | NORTH LATITUDE 43°34' WEST LATITUDE 133 | M |
| 2 | Photo001.jpg | P | CAMERA A | 2010/3/31 12:10:02 | NORTH LATITUDE 43°34' WEST LATITUDE 133 | M |
| 3 | Photo002.jpg | P | CAMERA A | 2010/3/31 15:30:41 | NORTH LATITUDE 43°34' WEST LATITUDE 133 | A |
| ... | | | | | | |
| 1001 | Pic0001.jpg | P | CAMERA B | | | M |
| 1002 | Pic0002.jpg | P | CAMERA B | | | M |
| ... | | | | | | |
| 2001 | Aaa001.jpg | P | CAMERA C | | | M |
| 2002 | Aaa002.jpg | P | CAMERA C | | | A |
| ... | | | | | | |
| 3001 | Movie001.mpg | M | CAMERA D | | | M |
| 3002 | Movie002.mpg | M | CAMERA D | | | M |
| 3003 | Movie003.mpg | M | CAMERA D | | | M |
| ... | | | | | | |
| 4001 | Mobile001.jpg | P | CAMERA E | | | M |
| 4002 | Mobile002.jpg | P | CAMERA E | | | M |
| ... | | | | | | |
| 5001 | Mobilemov001.3gp | M | CAMERA E | | | M |
| 5002 | Mobilemov002.3gp | M | CAMERA E | | | M |
| ... | | | | | | |
| 9001 | Otherpic001.jpg | P | OTHER | | | M |
| 9002 | Otherpic002.jpg | P | OTHER | | | M |

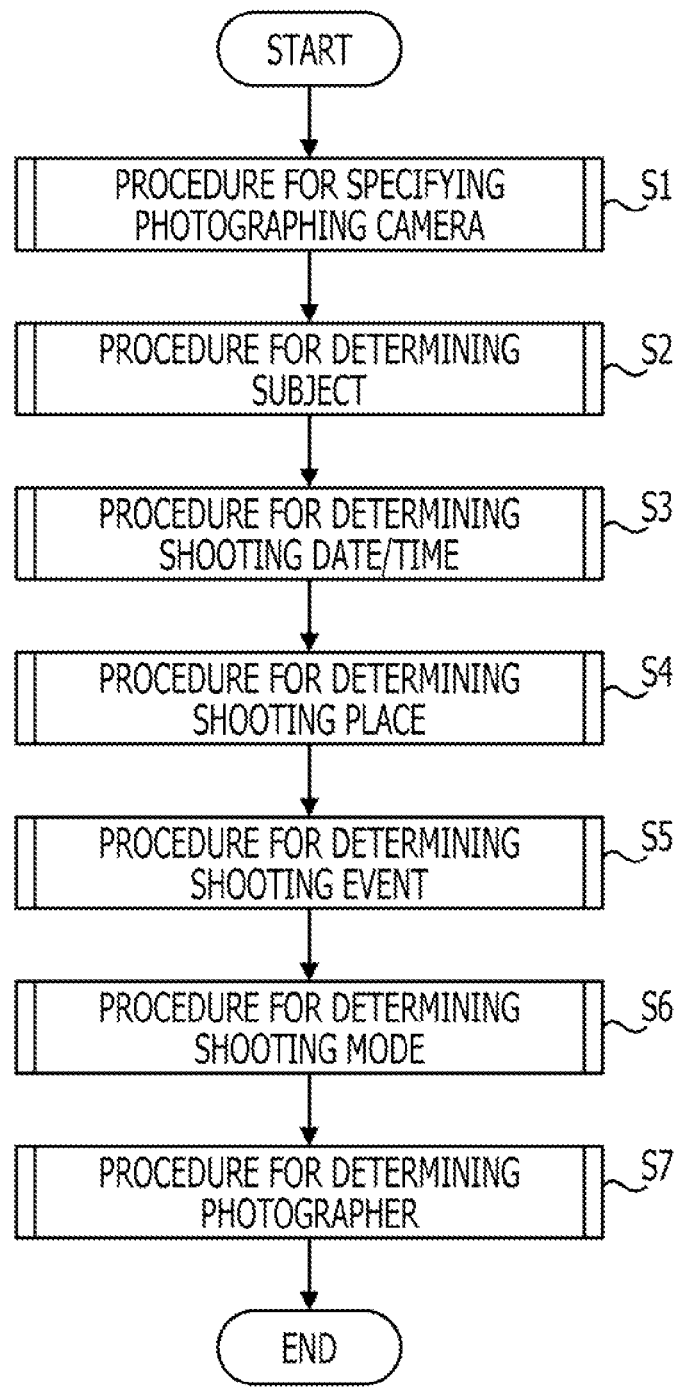

FIG. 5

| CAMERA ID | ATTRIBUTE | OWNER ID | CORRELATION PARAMETER 1 | CORRELATION PARAMETER 2 |
|---|---|---|---|---|
| CAMERA A | DIGITAL CAMERA | OWNER A | 70 | 20 |
| CAMERA B | CELL PHONE | OWNER A | 100 | 0 |
| CAMERA C | DIGITAL CAMERA | OWNER B | 70 | 20 |
| CAMERA D | VIDEO CAMERA | OWNER B | 80 | 10 |
| CAMERA E | CELL PHONE | OWNER B | 100 | 0 |

CAMERA OWNER DB

FIG. 7

| INDEX | SUBJECT ID | SUBJECT NAME | PERSONAL IMAGE |
|---|---|---|---|
| 1 | SUBJECT 1 | MOM | p001.JPG |
| 2 | SUBJECT 2 | DAD | p002.JPG |
| 3 | SUBJECT 3 | TARO | p003.JPG |
| 4 | SUBJECT 4 | HANAKO | p004.JPG |
| 5 | SUBJECT 5 | YUKI | p005.JPG |
| 999 | SUBJECT 999 | OTHER | ... |

SUBJECT DB

FIG. 8

| INDEX | FILE INDEX | SUBJECT ID | SUBJECT PROBABILITY |
|---|---|---|---|
| 1 | 1 | SUBJECT 1 | 90 |
| 2 | 1 | SUBJECT 2 | 80 |
| 3 | 2 | SUBJECT 1 | 60 |
| 4 | 4 | SUBJECT 3 | 70 |
| 5 | 4 | SUBJECT 4 | 70 |
| 6 | 4 | SUBJECT 5 | 80 |

SUBJECT INFORMATION

FIG. 14

| FILE INDEX | FILE NAME | PHOTOGRAPHER | PHOTOGRAPHER PROBABILITY |
|---|---|---|---|
| 1 | Photo000.jpg | MAM | 70 |
| 2 | Photo001.jpg | MAM | 60 |
| 3 | Photo002.jpg | AUTO | 10 |
| | ... | | |
| 1001 | Pic0001.jpg | MAM | 100 |
| 1002 | Pic0002.jpg | MAM | 90 |
| | ... | | |
| 2001 | Aaa001.jpg | DAD | 90 |
| 2002 | Aaaa002.jpg | AUTO | 100 |
| | ... | | |
| 3001 | Movie001.mpg | DAD | 80 |
| 3002 | Movie002.mpg | DAD | 90 |
| 3003 | Movie003.mpg | DAD | 60 |
| | ... | | |
| 4001 | Mobole001.jpg | DAD | 100 |
| 4002 | Mobole001.jpg | DAD | 90 |
| | ... | | |
| 5001 | Mobilemov001.3gp | DAD | 90 |
| 5002 | Mobilemov001.3gp | DAD | 100 |
| | ... | | |
| 9001 | Otherpic001.jpg | UNKNOWN | - |
| 9002 | Otherpic002.jpg | UNKNOWN | |

INFORMATION PROCESSING APPARATUS AND INFORMATION PROCESSING METHOD

CROSS-REFERENCE TO RELATED APPLICATIONS

This application is based upon and claims the benefit of priority of the prior Japanese Patent Application No. 2010-179251, filed on Aug. 10, 2010, the entire contents of which are incorporated herein by reference.

FIELD

The present invention relates to an information processing technique for managing still pictures and videos.

BACKGROUND

In homes, efficient management of photographed still pictures and videos has been desired along with the popularization of imaging devices, such as digital-still cameras, video cameras, and portable terminal devices with functions for shooting still images and videos. Conventionally, a method for managing photographed still pictures and videos has been known in the art. The method stores the pictures and videos in an information processing apparatus with a large capacity storage device, such as a personal computer, and manages each of the pictures and videos with the shooting date and time, shooting place, a photographed person, and the like.

Furthermore, there is a demand for specifying persons who had taken pictures and videos (hereinafter, collectively referred to as "images") to be managed. This demand may occur due to the following three main reasons.

The first reason is a request to provide feedback on an appropriate camera technique to a photographer who had taken the image to be managed. For example, if a resulting still picture has poor image qualities due to handshake, improper white balance, taking photographs against the sun, improper composition, or the like, the photographer who had taken the still picture may improve his or her camera techniques by obtaining feedback about the causes of the poor image quality.

A second reason is a request to classify many images according to photographers to manage these images.

A third reason is a request to analyze action history, taste, and the like of the photographers of images.

Various technologies have been known for specifying a photographer of an image on the basis of the image itself. These technologies include, for example, one for embedding the information about the photographer in a photo with audio data simultaneously recorded at the time of taking the photo, one for installing a fingerprint sensor in a camera, and one for installing a sensor for reading the information about the retina of the photographer in the finder of a camera.

Other technologies for specifying a photographer of an image include, for example, one for embedding imaging information, such as an electronic apparatus used for taking an image, the name of a person who had taken the image, a shooting place, and a shooting time as identification information, and one for displaying an icon of the person who taken the image using a thumbnail-size image.

SUMMARY

An information processing apparatus that estimates a photographer of an image includes, a first database in which an imaging device is previously associated with an owner of the imaging device among a plurality of persons, a second database in which the persons are previously associated with their respective personal images, a first determining unit to acquire information about the imaging device associated with an image of interest to be served as an object to be estimated as a photographer, to specify the owner associated with the acquired information about the imaging device with reference to the first database to obtain owner information, and to acquire a first value that represents a probability that each of the plurality of persons is a photographer of the image of interest, based on the owner information, a second determining unit to acquire a second value that represents a probability that each of the plurality of persons is a photographer of the image of interest, based on a result of making a comparison between a subject image included in the image of interest and each personal image in the second database; and a third determining unit to acquire a third value that represents a probability that each of the plurality of persons is a photographer of the image of interest.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating an exemplary configuration of an information processing apparatus of an embodiment.

FIG. 2 is a diagram illustrating exemplary captured image information in the embodiment.

FIG. 3 is a flowchart illustrating the overall operation of the information processing apparatus of the embodiment.

FIG. 5 is a diagram illustrating an exemplary camera owner database in the present embodiment.

FIG. 7 is a diagram illustrating an exemplary subject database in the embodiment.

FIG. 8 is a diagram illustrating exemplary subject information in the embodiment.

FIG. 14 is a diagram illustrating exemplary photographer information in the embodiment.

DESCRIPTION OF EMBODIMENTS

Figure 4:
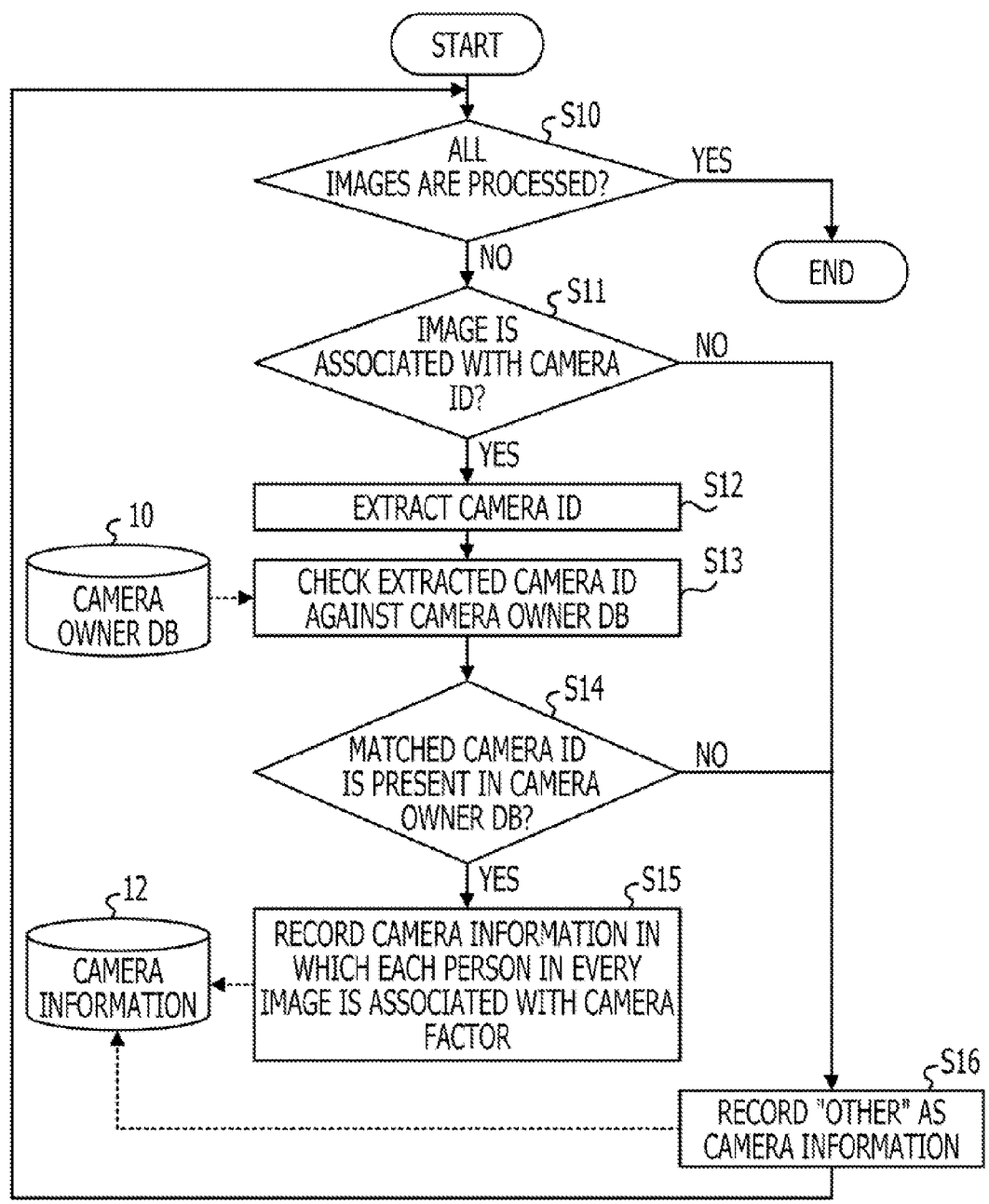
FIG. 4 is a flowchart illustrating the details of a procedure for specifying a camera used for taking an image in the information processing apparatus of the embodiment.

Hereinafter, an exemplary information processing apparatus and an exemplary information processing method according to an embodiment will be described. According to the present embodiment, for example, an information processing apparatus 1 is a personal computer or a mobile terminal apparatus, but is not limited thereto. Alternatively, the information processing apparatus 1 may be any apparatus having a calculation function which is realizable by a central processing unit (CPU) or the like and a storage function for storing data. A digital still camera, a video camera, a mobile terminal apparatus with functions of capturing still pictures and videos, and the like may serve as the information processing apparatus 1 of the present invention as long as the aforementioned functions are provided.

(1) Configuration of Information Processing Apparatus 1

The information processing apparatus 1 of the present embodiment is constructed so that a photographer of an image which has been already taken may be predicted with a certain degree of probability from a population including a plurality of previously registered persons. FIG. 1 is a block diagram illustrating the configuration of the information processing apparatus 1 of the present embodiment.

As illustrated in FIG. 1, the information processing apparatus 1 of the present embodiment includes a camera owner DB (first database) 10, a photographing camera specifying unit (first determining unit) 11, a camera information storage unit 12, a subject DB (second database) 13, a subject determining unit 14, a subject information storing unit 15, a shooting date/time determining unit 16, a shooting place determining unit 17, a shooting event information storage unit 18, a shooting event information storing unit 19, a shooting mode determining unit 20, a shooting mode information storage unit 21, and a photographer determining unit 22 (second determining unit, third determining unit). The information processing apparatus 1 may have captured image information 100 that includes a plurality of image files, images which have been already acquired by shooting, or may access the captured image information 100. The information processing apparatus 1 estimates photographers of images corresponding to the respective image files and generates the photographer information 110 in which the estimated photographers are recorded for the respective image files.

FIG. 2 is an exemplary list of image files in the captured image information 100.

In each image file, an image is correlated with a file index, a file name, an image attribute, a camera ID, shooting date/time information, shooting place information, shooting mode information, and the like. The file name is the file name of an image on the information processing apparatus 1. When the information processing apparatus 1 is an imaging device that has taken the image or the image is directly copied as an image file from an imaging device to the information processing apparatus 1, the file name may be provided based on criteria in the imaging device. In the example illustrated in FIG. 2, the image attributes are "P" for still images and "M" for videos. The image attribute may be usually found from a file extension.

The camera ID is information generated as a result of specifying a camera, which is used as an imaging device used for taking a corresponding image, by the photographing camera specifying unit 11. Then, the camera ID is recorded by the photographing camera specifying unit 11. The camera ID is information that is uniquely defined for one camera. For example, in FIG. 2, a plurality of images provided with the camera ID "camera A" means that these images are taken by the same camera.

The shooting date/time information is recorded by the shooting date/time determining unit 16. If an image is a still picture, an image file includes exchangeable image file format (Exif) information.

Thus, the shooting date/time information may be recorded with reference to the Exif information.

The shooting place information is recorded by the shooting place determining unit 17. When the imaging device includes a global positioning system (GPS) system function and the image file is associated with information of latitude and longitude as the information of a shooting place, the latitude and longitude information may be recorded as the photographic place information.

The shooting mode information is recorded by the shooting mode determining unit 20. In the example illustrated in FIG. 2, the shooting mode is "A" (corresponding to the imaging mode factor=zero (0), which will be described later) if an image is obtained by remote control or timer control, and the shooting mode is "M" (corresponding to the imaging mode factor=one (1), which will be described later) if an image is automatically obtained. In this case, since the above Exif information includes the imaging mode information, the imaging mode determining unit 20 may refer to the Exif information to acquire the imaging mode information.

The functions of the respective units in the information processing apparatus 1 of the embodiment are as follows.

The photographing camera specifying unit 11 calculates a camera factor representing the probability that each registered person is a photographer based on the information about the owner of a camera shooting an image of interest (an image to be processed among images) with reference to the camera owner DB 10. Then, the calculated camera factor is recorded in the camera information storage unit 12.

The subject determining unit 14 refers to a subject DB 13 to compare personal images in the subject DB 13 and subject images in the image of interest. Then, the subject determining unit 14 generates subject information as described later, followed by storing the subject information in the subject information storage unit 15.

The shooting date/time determining unit 16 specifies or estimates the shooting date/time of the image of interest and records the shooting date/time in the photographer information 110. The shooting place determining unit 17 specifies or estimates the shooting place of the image of interest and records it in the photographer information 110.

The shooting event determining unit 18 associates a plurality of images to be processed with the same event based on the shooting date/time information or shooting place information of the image of interest and then records the shooting event information that represents this association in the shooting information storage unit 19.

The shooting mode determining 20 sets a shooting mode factor that represents whether the image of interest is obtained by remote control or timer control when the shooting mode information of the image of interest is obtainable. Then the shooting mode determining unit 20 associates the shooting mode factor with an image and records the shooting mode factor in the shooting mode information storage unit 21.

The photographer determining unit 22 accesses the camera owner DB 10, the camera information storage unit 12, the subject information storage unit 15, the shooting event information storage unit 19, and the shooting mode information storage unit 21. The photographer determining unit 22 performs predetermined arithmetic processing as described later and estimates the photographer of each image, followed by recording the photographer of each image in the photographer information 110.

In the configuration of the information processing apparatus 1 illustrated in the FIG. 1, any of the photographing camera specifying unit 11, the subject determining unit 14, the shooting date/time determining unit 16, the shooting place determining unit 17, the shooting mode determining unit 20, and the photographer determining unit 22 may be part of functions obtained when a CPU (not illustrated) executes a program. A plurality of DBs in FIG. 1, for example, may be stored in a data storage such as a hard disk drive (HDD). A plurality of storages in FIG. 1 may be constructed of memories such as random access memories (RAMs).

(2) Operation of Information Processing Apparatus 1

Next, the operation of the information processing apparatus 1 will be described with a concrete example. In the following description, FIGS. 3 to 14 will be referenced accordingly. In the following description, an image to be processed among a plurality of images is represented as an "image of interest". The following exemplary operation is designed such that two or more members in one family are included as previously registered persons (population) and estimates the photographer of a specific image among the previously registered persons. However, a person skilled in the art may easily understand that the previously registered population is not specifically limited to the above population and any population may be arbitrarily set up.

FIG. 3 is a flowchart illustrating the overall operation of the information processing apparatus 1. As illustrated in FIG. 3, the operation of the information processing apparatus 1 includes the following procedures. A procedure for specifying a photographing camera is mainly executed by the photographing camera specifying unit 11 (OPERATION S1). A procedure for determining a subject is mainly executed by the subject determining unit 14 (OPERATION S2). A procedure for determining shooting date and time (also referred to as "shooting date/time") is mainly performed by the shooting date/time determining unit 16 (OPERATION S3). A procedure for determining a shooting place is mainly performed by the shooting place determining unit 17 (OPERATION S4). A procedure for determining an event is mainly performed by the shooting event determining unit 18 (OPERATION S5). A procedure for determining a shooting mode is mainly performed by the shooting mode determining unit 20 (OPERATION S6). A procedure for determining a photographer is mainly performed by the photographer determining unit 22 (OPERATION S7).

The terms "owner ID", "subject ID", "subject name" in the figures illustrating exemplary databases or information, which will be mentioned below, are only represented as indication examples for convenience in description. In the actual data processing, data management is performed using characteristic numbers or codes assigned to the respective persons previously registered into the information processing apparatus 1.

(2-1) Procedure for Specifying Photographing Camera

FIG. 4 is a flowchart illustrating the details of the procedure for specifying a camera in the operation S1 in FIG. 3.

In FIG. 4, the procedures subsequent to the operation S1 are performed for all the images as targets, from which photographers of the respective images are estimated (OPERATION S10). First, the photographing camera specifying unit 11 determines whether an image of interest is associated with camera IDs which are unique to the respective cameras (OPERATION S11). In the operation S12, when the camera ID is included in the Exif information of the image of interest, the camera ID is extracted from the Exif information and then recorded in captured image information 100. In most cases, the file names of the respective images are automatically provided with prefix characters unique to camera manufacturers. Thus, the camera ID may be obtained by referring to the prefix characters. Next, the photographing camera specifying unit 11 compares the camera ID obtained in the operation S12 with the camera owner DB 10 (OPERATION S13). Then, the photographing camera specifying unit 11 determines whether the camera ID obtained in the operation S12 is present in the camera owner DB 10 (OPERATION S14).

An exemplary camera owner DB 10 is illustrated in FIG. 5.

In the example illustrated in FIG. 5, the camera owner DB10 represents association among unique camera IDs, camera attributes, and owner IDs.

Two correlation parameters are defined in the camera owner DB 10. These correlation parameters are uniquely determined according to the camera attribute. In FIG. 5, a correlation parameter 1 represents a correlation value between an owner and a photographer in terms of a percentage (%), and a correlation parameter 2 represents a correlation value between a person other than the owner and the photographer in terms of a percentage (%). The phrase "correlation value between an owner and a photographer in terms of a percentage (%)" may be replaced with "a probability of matching the owner and the photographer in terms of percentage (%)". Here, the correlation parameters do not need to be always defined in the camera owner DB 10. The correlation parameters may be in another format that allows the photographing camera specifying unit 11 to be accessible using the camera attribute as a key. In either case, each correlation parameter is defined in advance so as to be uniquely determined according to the camera attribute.

In the example illustrated in FIG. 5, the correlation parameter 1 is set to "70" and the correlation parameter 2 is set to "20" when the camera attribute is a digital camera (hereinafter, this means a "digital still camera"). This is based on the assumption that the photographer would be the owner or another member of a family even though, for example, cheap camera models have spread in recent years and two or more cameras may be owned in a home. However, it may not be overemphasized that these parameters may be suitably defined according to the situation.

In the example illustrated in FIG. 5, the correlation parameter 1 is set to "80" and the correlation parameter 2 is set to "10" when the camera attribute is a video camera (hereinafter, "video camera" indicates a "digital video camera"). This is because video cameras are still expensive. For example, the possibility of having two or more video cameras in a home is low. Thus, the possibility that the photographer is the owner is higher than that of the digital camera. It will be appreciated that the parameters may be suitably defined depending on the situation.

In the example illustrated in FIG. 5, when the camera attribute is a cell phone, the correlation parameter 1 is set to "100" and the correlation parameter 2 is set to "0". This is because most cell phones are owned by individuals and thus the photographer may be considered as the owner. It will be appreciated that the parameters may be suitably defined depending on the situation.

When the camera ID acquired in the operation S12 is found in the camera owner DB 10 in the operation S14 illustrated in FIG. 4, the photographing camera specifying unit 11 extracts the values of the correlation parameters corresponding to the camera ID. Furthermore, the photographing camera specifying unit 11 calculates camera factors corresponding to the registered persons for every image of interest. Camera information in which each person is brought into correspondence with the camera factor is recorded in the camera information storage unit 12 (OPERATION S15). Then, the camera factor is calculated based on the correlation parameters 1 and 2 as follows.

A method for calculating a camera factor is as follows.

A camera factor of an owner of a camera used for taking an image of interest among family members is set to correlation parameter "1" according to the camera attribute. A camera factor of any family member other than the owner of the camera used for taking the image of interest is set to correlation parameter "2". When a person other than a family member is registered, a camera factor of this person is set to "1—correlation parameter 1—correlation parameter 2". Thus, by setting the camera factor as described above, the camera factor (first value) serves as a value that represents a certainty that each of the registered persons is the photographer based on the information about the owner of the camera that has taken the image of interest.

Furthermore, when the camera ID is not associated with the image of interest in the operation S11, it means that the image of interest was taken by the person other than the family member. In this case, therefore, in the captured image information 100, the camera ID corresponding to the image of interest is recorded as, for example, "others" (OPERATION S16), and the image of interest is substantially removed from estimated targets of the photographer.

(2-2) Procedure for Determining Subject

Figure 6:
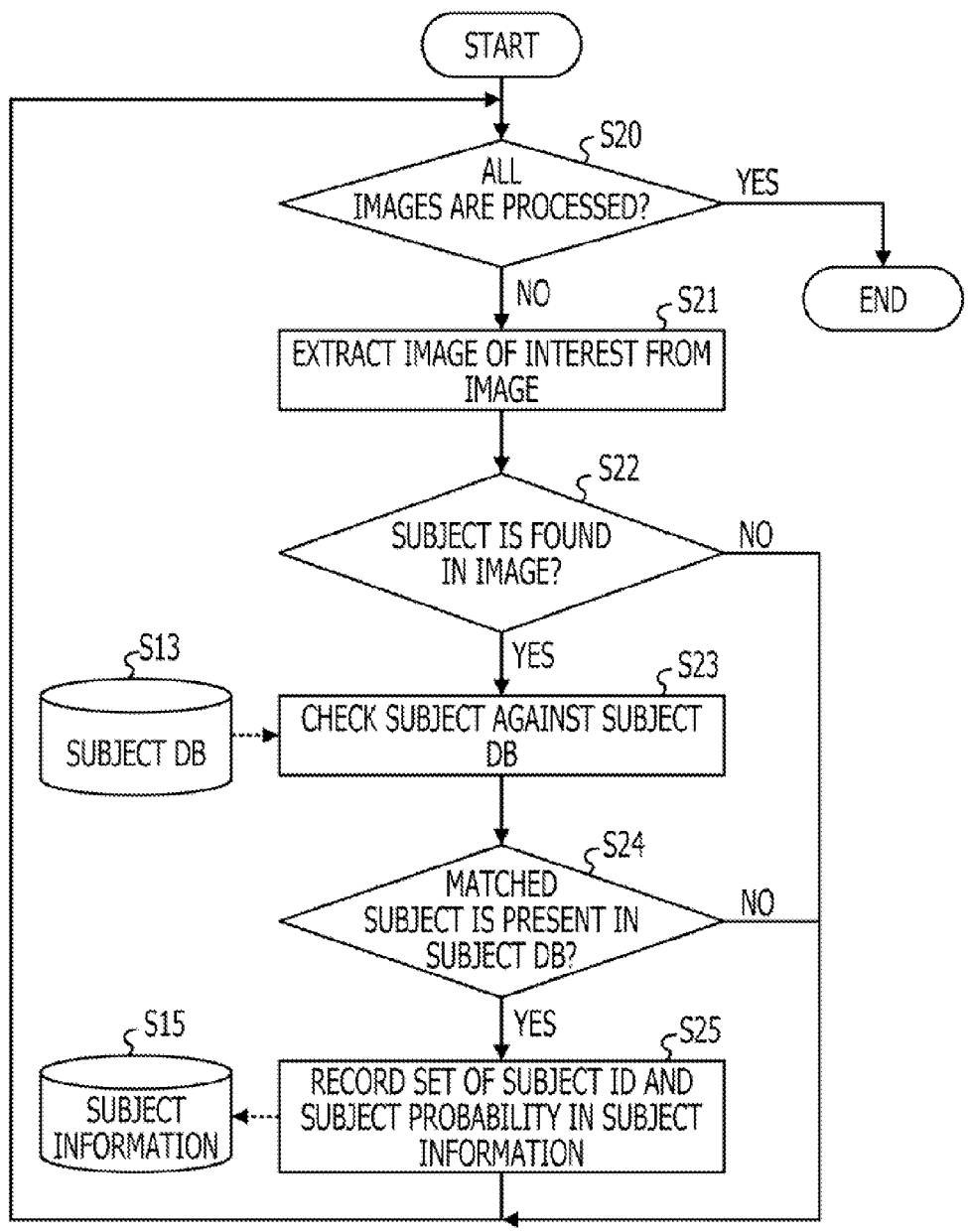
FIG. 6 is a flowchart illustrating the details of a procedure for determining a subject of the information processing apparatus of the embodiment.

FIG. 6 is a flowchart illustrating the details of the procedure for determining a subject in the operation S2 in FIG. 3.

In FIG. 6, the procedures subsequent to the operation S21 are performed for all the images as targets from which photographers of the respective images are estimated (OPERATION S20). The subject determining unit 14 attempts extraction of an image of interest from the image of interest (OPERATION S21). As a result, when the subject is photographed on the image of interest ("YES" in OPERATION S22), the subject determining unit 14 is compared with the subject DB 13 (OPERATION S23). When using a facial recognition technology, the face of the subject is extracted as a part of the subject image from the image of interest and brought into comparison.

An exemplary subject DB 13 is illustrated in FIG. 7.

In the subject DB 13, at least the IDs of the respective registered persons (represented by "subject IDs" in FIG. 7) are brought into correspondence with the personal images corresponding to the respective persons (p001.jpg and the like in FIG. 7). A personal image corresponding to each subject ID is used for comparison with the image of interest extracted from the image of interest. For example, a known facial recognition technology may be applied to the image comparison.

When the corresponding subject is present in the subject DB 13 as a result of the comparison in the operation S23 ("YES" in operation S24), the image, the subject ID, and the probability of matching the subject (subject probability) are recorded as subject information in the subject information storage unit 15 (OPERATION S25). At this time, for example, the subject probability may be the degree of subject matching obtained by a facial recognition algorithm. When two or more subjects are present with respect to the image of interest, the image is associated with the subject IDs and the subject probabilities of the respective subjects.

Exemplary subject information is illustrated in FIG. 8. In FIG. 8, the item "Index" is the index of subject information itself and "File Index" is the file index of an image. For example, an image with a file index of "4" includes three persons with subject IDs of "3", "4", and "5". The probabilities of the subjects are "70%", "70%", and "80%", respectively.

(2-3) Procedure for Determining Shooting Date and Time

Figure 9:
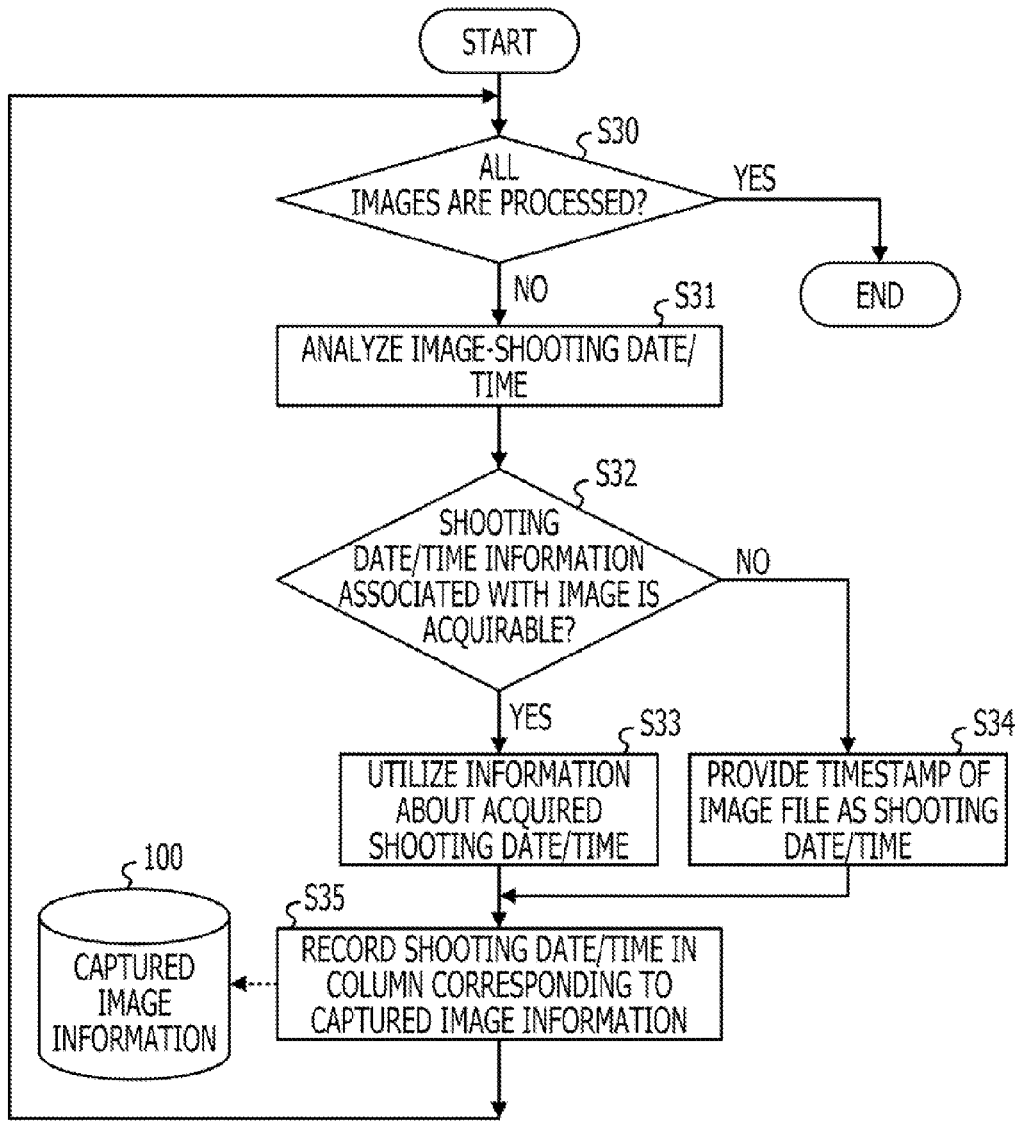
FIG. 9 is a flow chart illustrating the details of a procedure for determining the shooting date and time of the information processing apparatus of the embodiment.

FIG. 9 is a flow chart illustrating the details of a procedure for determining shooting date and time in the operation S3 in FIG. 3.

In FIG. 9, the procedures subsequent to the operation S31 are performed for all the images as targets from which photographers of the respective images are estimated (OPERATION S30). First, the shooting date/time determining unit 16 analyzes the shooting date and time of an image of interest (OPERATION S31). In the case of a still image, Exif information includes shooting date/time information. Thus, the shooting date and time of the image may be obtained by referring to the Exif information. A video is generally associated with storage date and time. Thus, the storage date and time may be regarded as the shooting date and time. In the case of the video, furthermore, a shooting period is also known in general. Thus, when the shooting date/time information associated with the image is acquirable ("YES" in OPERATION S33), the shooting start date and time may be estimated as those obtained by counting back in time to the shooting period from the storage date and time of the video. The shooting date/time determining unit 16 uses the information of the acquired shooting date and time (OPERATION S33) to record the information of the shooting date and time in the column of the "shooting date/time" of the image file in the captured image information 100 (OPERATION S35). If the shooting date/time information associated with the image is not acquirable, e.g., "NO" in the operation step S32, the time stamp of the image file is recorded in the column of "shooting date/time" (OPERATIONS S34, S35).

(2-4) Procedure for Determining Shooting Place

Figure 10:
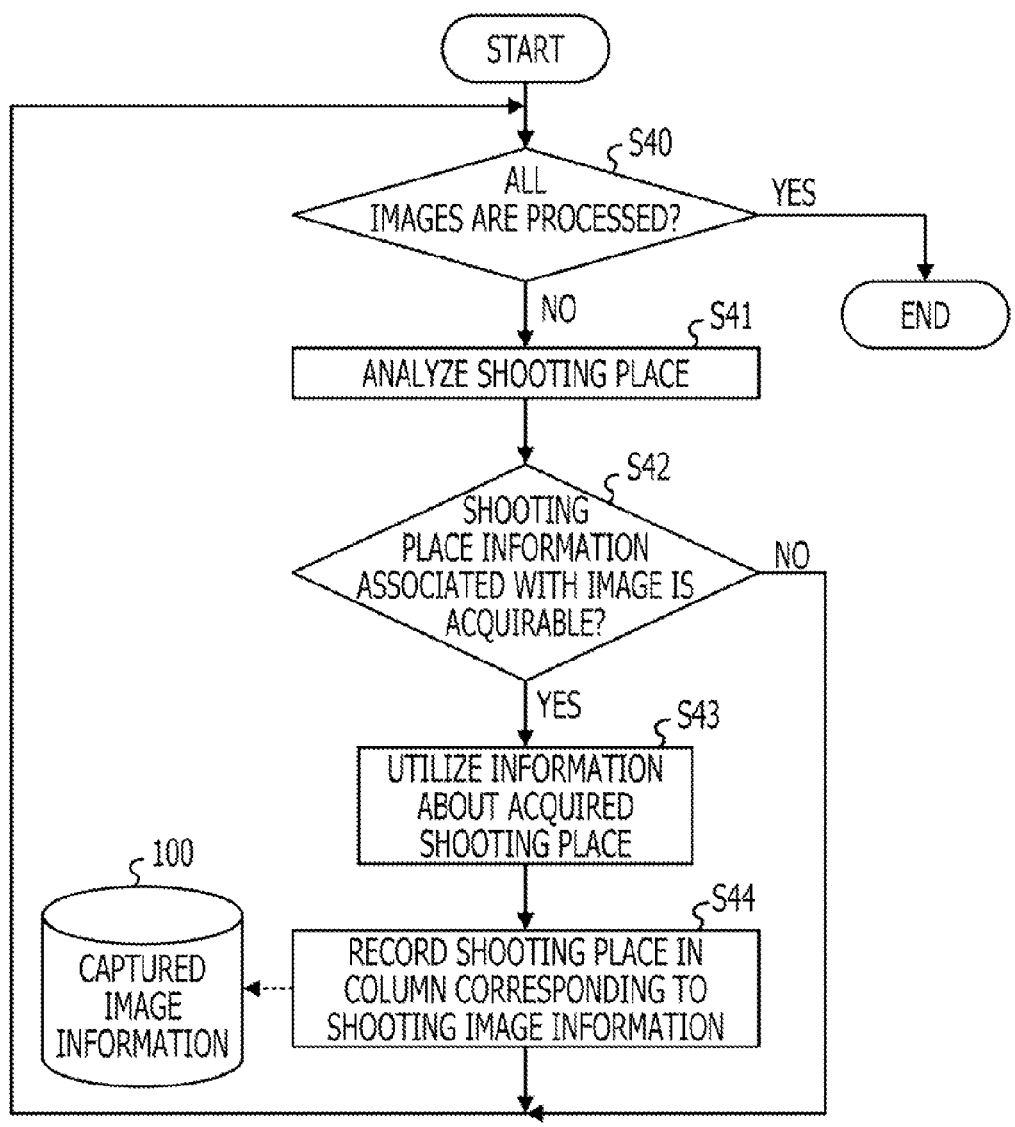
FIG. 10 is a flow chart illustrating the details of a procedure for determining a shooting place of the information processing apparatus of the embodiment.

FIG. 10 is a flow chart illustrating the details of a procedure for determining a shooting place in the operation S4 in FIG. 3.

In FIG. 10, the procedures subsequent to the operation S41 are performed for all the images as targets from which photographers of the respective images are estimated (OPERATION S40). First, the shooting place determining unit 17 analyzes the shooting place of an image of interest (OPERATION S41). When the camera that has taken the image of interest includes a GPS system function, and the image file is associated with information of latitude and longitude as the information of a shooting place and imported in the image processing apparatus 1, the latitude and longitude information may be recorded as the photographic place information. In this case ("YES" in OPERATION S42), the acquired shooting place information is used (OPERATION S43) to record the shooting place information on the image file in the captured image information 100 (OPERATION S44). In the case of "NO" in the operation S42, nothing is recorded in the column of the "shooting place" of the image file in the captured image information 100.

(2-5) Procedure for Determining Shooting Event

Figure 11:
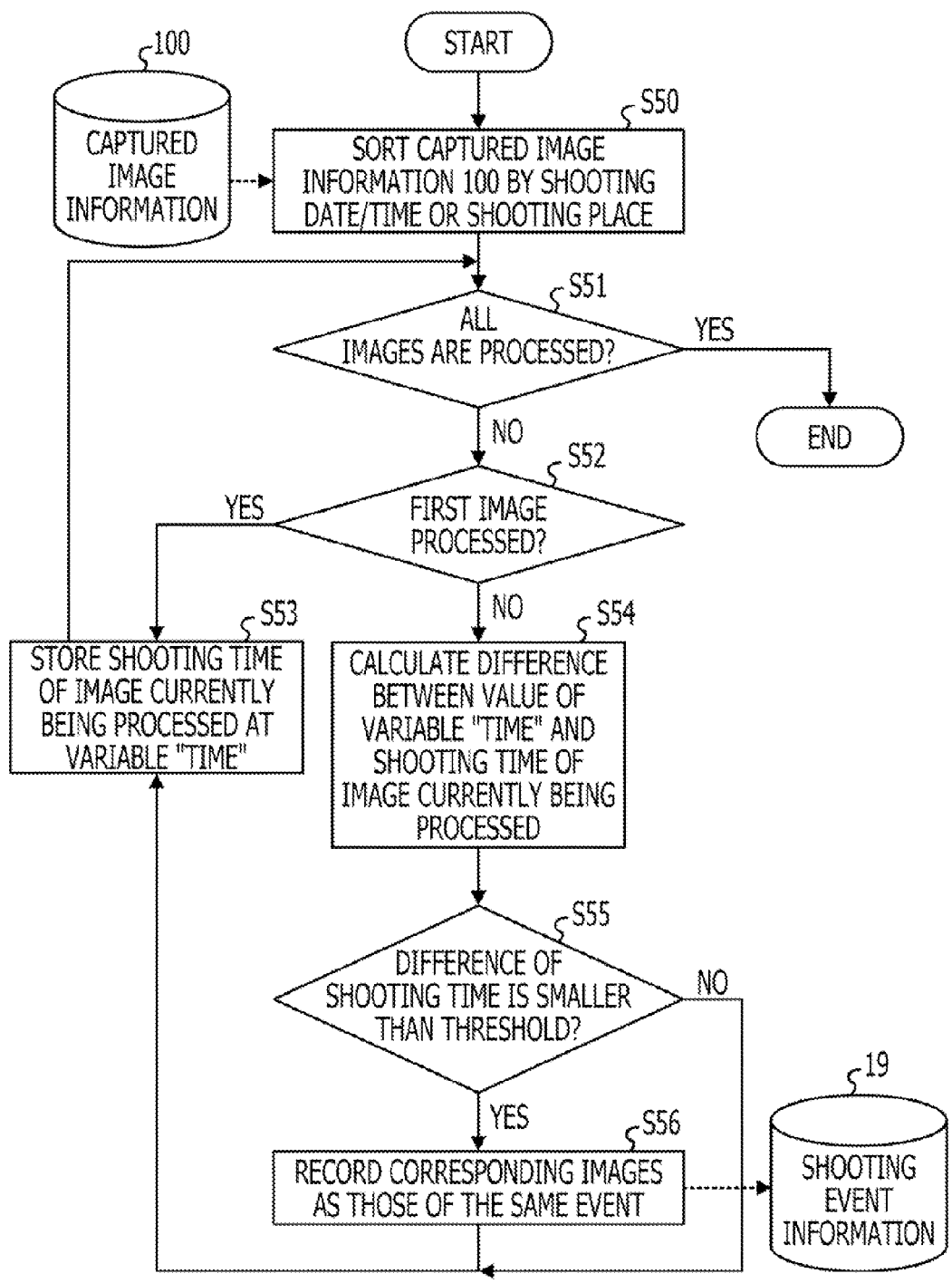
FIG. 11 is a flow chart illustrating the details of a procedure for determining a shooting event of the information processing apparatus of the embodiment.

FIG. 11 is a flow chart illustrating the details of a procedure for determining a shooting event in the operation S5 in FIG. 3.

First, in FIG. 11, the shooting event determining unit 18 sorts captured image information 100 by a shooting date and time or a shooting place (OPERATION S50). The procedures subsequent to the operation S52 are performed for all the images as targets from which photographers of the respective images are estimated (OPERATION S51). In FIG. 11, the procedures subsequent to the operation S52 are those of an exemplified case where the sorting procedure in the operation S50 is performed for the shooting date and time.

First, in the case of processing the first image among two or more images (in other words, the image with the earliest shooting time) ("YES" in OPERATION S52), the shooting event determining unit 18 stores the value of the shooting time of the first image in a variable "Time" (OPERATION S53). The process returns to the operation S51 and then enters processing for the second image (that is, an image with the second earliest shooting time). The shooting event determining unit 18 advances the processing of the second image to the operation S54 and calculates a difference between the value of the variable "Time" (the shooting time of the first image) and the shooting time of the image currently being processed (the second image). As a result, when the difference between the shooting times is smaller than a predetermined threshold value, this shooting event determining unit 18 records the photography event information as information that indicates that the corresponding two or more images are those of the same event, in the shooting event information storage unit 19 (OPERATION S56) and then advances the processing to operation S53. When the difference between the shooting times of the images is smaller than a predetermined threshold (for example, the threshold is set to a value representing a short time of several seconds), the possibility that the photographers of the respective images are the same is high. Thus, storing the shooting event information may be useful for increasing the precision of estimating the photographer in subsequent procedures. When the difference between the shooting times is not less than the predetermined threshold value, the process proceeds to the operation S53.

In the operation S53, the value of a shooting time of an image where the value of the variable "Time" is currently being processed (that is, the second image) is stored. Subsequently, a third image (that is, an image with the third earliest shooting time) is processed. Hereinafter, in a manner similar to the above description, all the sorted images are processed. In the above process, among the images sorted with reference to their shooting dates and times, adjacent images with shooting times that are very near to each other may be estimated as those obtained by shooting at the same event. In the shooting event information, these images are associated with one another as those of the same event.

(2-6) Procedure for Determining Shooting Mode

Figure 12:
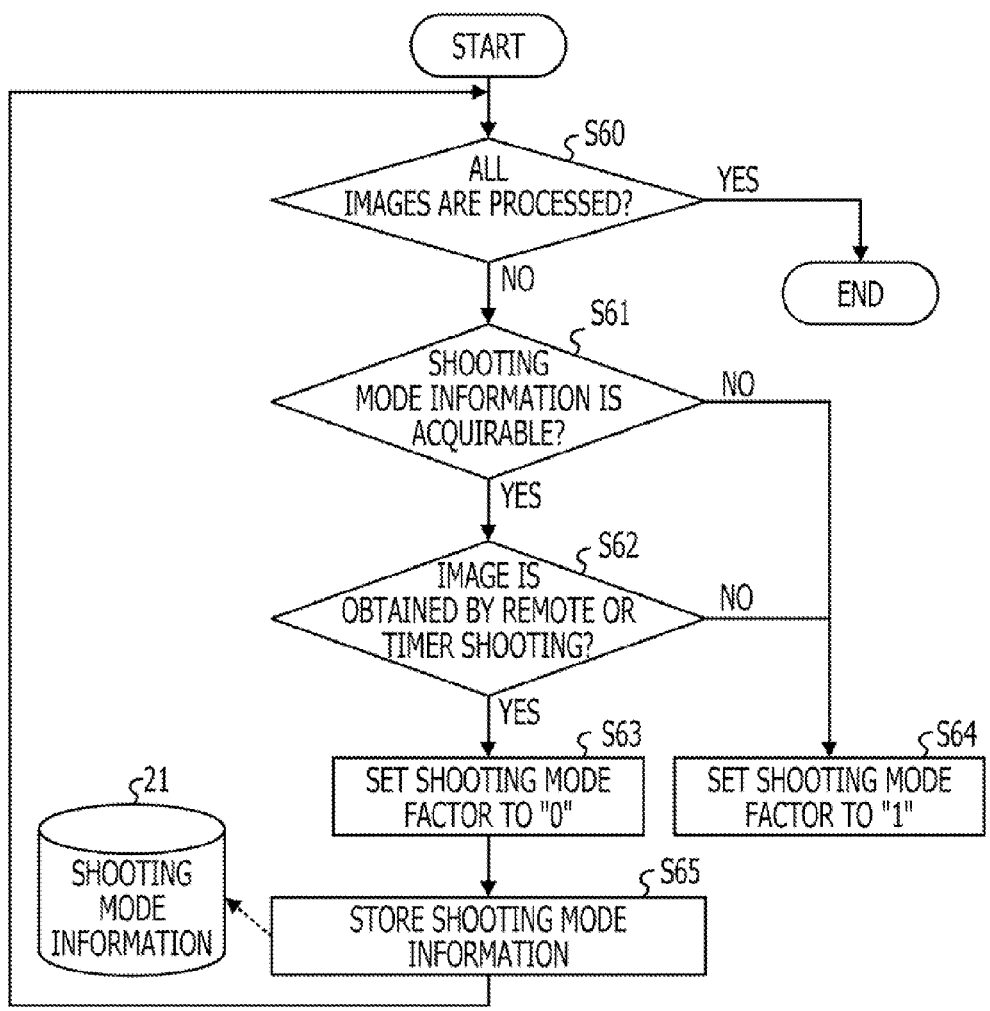
FIG. 12 is a flow chart illustrating the details of a procedure for determining a shooting mode of the information processing apparatus of the embodiment.

FIG. 12 is a flow chart illustrating the details of a procedure for determining a shooting mode in the operation S6 in FIG. 3.

In FIG. 12, the procedures subsequent to the operation S61 are performed for all the images as targets from which photographers of the respective images are estimated (OPERATION S60). First, the shooting mode determining unit 20 determines whether shooting mode information is obtainable or not (OPERATION S61). Here, the shooting mode information includes information about whether the image of interest is one obtained by remote control (so-called remote control shooting) or timer control (so-called timer shooting). For example, Exif information which is obtainable for the corresponding image includes information about an aperture value and the like in addition to the information about whether the image of interest is one obtained by remote control or timer control as shooting mode information. When the imaging mode information is obtainable by the Exif information and the like ("YES" in OPERATION S61), it is determined whether the image of interest is one obtained by remote control or timer control as shooting mode information (OPERATION S62). As a result, the shooting mode determining unit 20 sets a shooting mode factor to "0 (zero)" when the image of interest is obtained by remote control or timer control (OPERATION S63), or "1 (one)" when the image of interest is not obtained (OPERATION S64). Then, the shooting mode information, which is the data associated with the image and the shooting mode factor thereof, is stored in the imaging mode information storage unit 21 (OPERATION S65).

(2-7) Procedure for Determining Photographer

Figure 13:
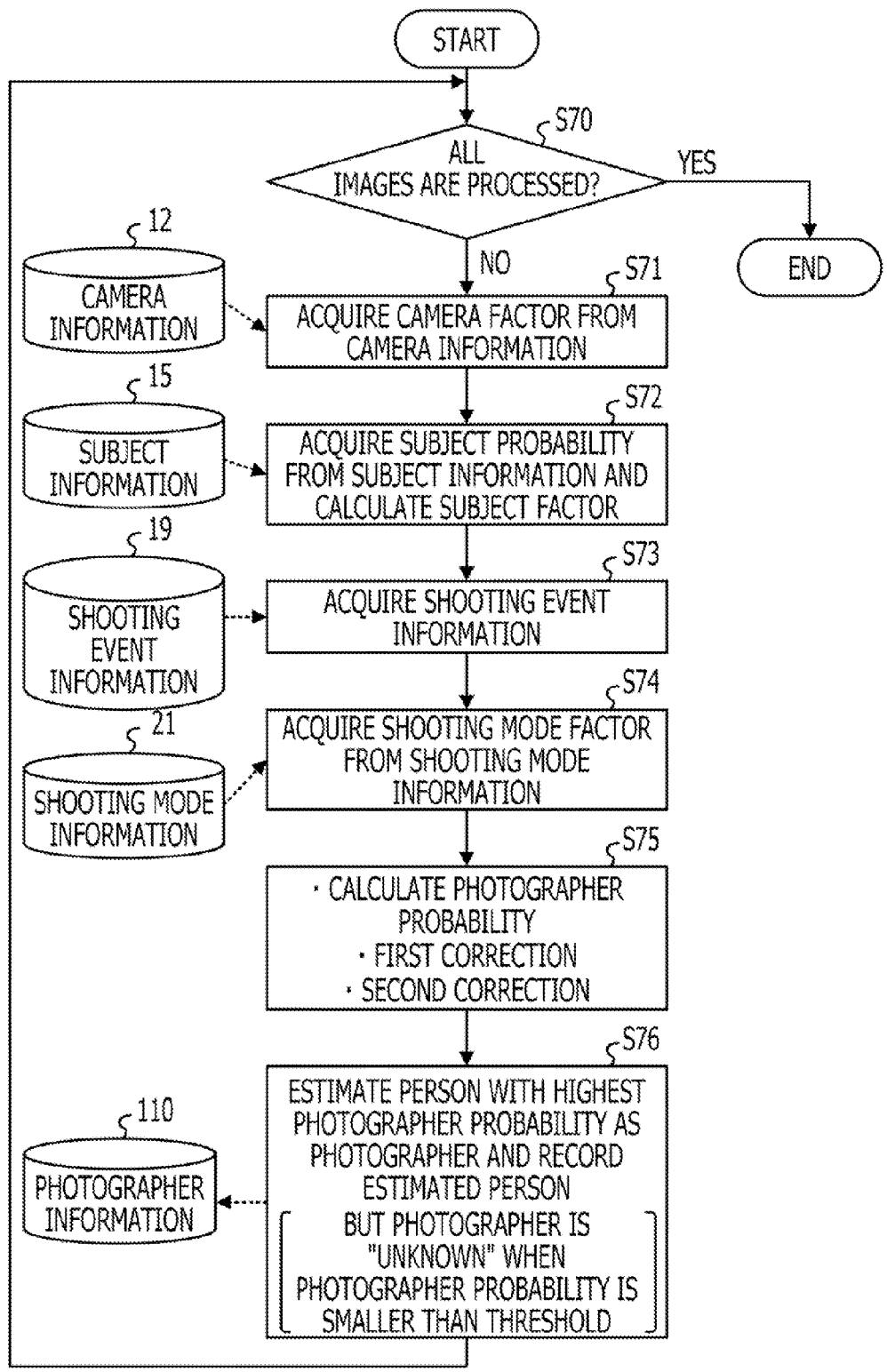
FIG. 13 is a flow chart illustrating the details of a procedure for determining a photographer of the information processing apparatus of the embodiment.

FIG. 13 is a flow chart illustrating the details of a procedure for determining a photographer in the operation S7 in FIG. 3. In addition, FIG. 14 is a diagram illustrating an example of the photographer information 110 sequentially recorded in the procedure for determining the photographer.

In FIG. 13, the procedures subsequent to the operation S71 are performed for all the images as targets from which photographers of the respective images are estimated (OPERATION S70). First, the photographer determining unit 22 accesses the camera information storage unit 12 and acquires the information about individual persons and camera factors which are associated with the image of interest. Next, the photographer determining unit 22 accesses the subject information storage unit 15 and acquires the subject probability for every subject ID associated with the image of interest. In addition, the subject factors of the respective registered persons are calculated (OPERATION S72).

Here, the subject factor (second value) is a value that represents the probability of each registered person being a photographer of the image of interest based on the result of subject image comparison. Hereinafter, a method for calculating a subject factor depending on a subject in an image of interest will be described for different cases A1 to A5 as follows. In the following description, the "case of being included as a subject in an image of interest" means that, for example, a subject image is extracted from an image of interest in the operation S21 in FIG. 6. The term "owner" means the owner of a camera used for taking an image of interest, which is obtained with reference to the camera owner DB 10.

(A1) In Case where Only Owner is Included in Image of Interest as a Subject

The camera owner DB 10 is referenced. Thus, in the case where the owner is found to be included as a subject in the image, a subject factor is calculated as follows:

Subject factor of owner=1−(subject probability of owner)

Subject factor of family member other than owner=1

Subject factor of third person other than family member=1

The reason for setting the subject factors as described above is that, if the camera owner is surely included as a subject in the image of interest, the photographer is not likely to be the owner. In fact, however, pattern recognition, such as facial recognition, does not always recognize the owner without an error. In this case, furthermore, the possibilities of respective persons other than the camera owner are equally present. Thus, the subject factor is set to "1 (one)". Here, setting the subject factor to "1" means that a photographer probability, which will be described later, is substantially defined with the camera factor.

(A2) in Case where all Family Members are Included as Subjects in Image of Interest When the subject information is referenced and all the family members are brought into correspondence with subject probabilities not less than a predetermined threshold, there is high possibility that a person other than family members would be asked to take an image. Therefore, as described below, it is preferable to set the subject factor of the person other than the family members slightly higher.

Subject factor of owner 1−(multiplied value of subject probabilities of all family members)

Subject factor of family member other than owner=1−(multiplied value of subject probabilities of all family members)

Subject factor of person other than family members=(multiplied value of subject probabilities of all family members)×1.2

Here, the "multiplied value of subject probabilities of all family members" expresses the probability that all family members exist as subjects. The example where the subject factor of the person other than the family members is set to 20% higher than others has been described. However, the present embodiment is not limited to this example and the subject factor may be arbitrarily set.

(A3) In Case where Image of Interest does not Include Owner and Specific Person in Family as Subjects but Includes Owner and Persons Other than the Specific Person in the Family as Subjects In this case, the specific person has a high possibility of being a photographer besides the owner. Thus, the subject factor of the specific person is set to slightly higher than that of another family member (one included in the subjects) as follows (in the following setting example, 20% higher).

Subject factor of owner=1−(subject probability of owner)

Subject factor of the above specific person=(1−(subject probability of this person))×1.2

Subject factor of family member other than the owner and specific person=1−(subject probability of person)

Subject factor of third person other than family member=1−(subject probability of third person)

(A4) In Case where Only Owner Among Family Members is not Included in Image of Interest and all Family Members Except Owner are Included as Subjects in Image of Interest In this case, the possibility that that owner is a photographer is very high. At this time, a setup of a subject factor is carried out as follows.

Subject factor of owner=1−(subject probability of owner)

Subject factor of a family member other than the owner=1−(the subject probability of this family member)

Subject factor of third person other than family member=1−(subject probability of third person)

(A5) In Case where any Person to be Estimated as Subject is not Included in Image of Interest or not Specified in Image of Interest (for Example, an Image in which Many People are Included and Crowded or a Scenery Image)

In this case, the subject factor is set as follows so that the subject probability is not substantially considered.

Subject factor of the owner=1

Subject factor of family member other than owner=1

Subject factor of third parson other than family members=1

The process will be described referring back to FIG. 13.

As described above, the process proceeds to the operation S73 after calculating the subject factor of each registered person. In the operation S73, the photographer determining unit 22 accesses the shooting event information storage unit 19 and acquires shooting event information relevant to the image of interest (OPERATION S73). As described above, the shooting event information is provided for indicating that the corresponding images are those of the same event and may be used for a first correction process as described below.

Then the photographer determining unit 22 acquires a shooting mode factor corresponding to the image of interest from the captured image by acquiring the shooting mode information storage unit 21 (OPERATION S74). As described above, the shooting mode factor is a value that represents whether the image of interest is obtained by remote control or timer control.

In the operation S75, first, a photographer probability (third value) is obtained according to the following equation (E1) based on the camera factor acquired in the operation S71 and the subject factor calculated in the operation S72.

Photographer probability (%)=camera factor×subject factor (E1)

The photographer probability is a value which comprehensively represents the probability that each of the registered persons is a photographer of the image of interest. Here, the camera factor is a value that represents a certainty that each of the registered persons is the photographer based on the information about the owner of the camera that has taken the image of interest. Here, the subject factor is a value that represents the probability of each registered person being a photographer of the image of interest based on the result of subject image comparison. Thus, the camera factor is multiplied by the subject factor. Then, the shooting probabilities of the respective registered persons may be obtained with high accuracy without using any auxiliary device such as a sensor.

In the operation S75, furthermore, it is preferable to perform a first correction process on the shooting probability based on the shooting event acquired in the operation S73. In the first correction process, based on the shooting event information, the following procedure is performed when the image of interest, which is currently being processed, and the image, which is already subjected to calculation of the photographer probability (hereinafter, referred to a "processed image"), are of the same event.

That is, when the image of interest and the processed image are taken by the same camera but these images have different photographer probabilities with respect to the corresponding identical person, the photographer probabilities of both images may be corrected to the one which was higher than the other before the correction. For example, when the photographer probability of a processed image to a certain person is 80% and the photographer probability of the image of interest to the person is 70%, the photographer determining unit 22 corrects the photographer probability of the image of interest to become 80%. When two or more images are taken in the same event, this correction applies in common with the photographer probability based on an image which is clearer than others. Therefore, the calculation accuracy of the photographer probability may be improved, leading to an increase in accuracy of estimating the photographer.

On the other hand, if the image of interest and the processed image were taken with different cameras, the photographers of these images would be changed within an extremely short time (for example, several seconds). However, this kind of a situation is difficult to imagine. Therefore, when the image of interest and the processed image are taken by different cameras and these images have different photographer probabilities with respect to the corresponding identical person, the photographer probabilities of both images may be corrected to the one which was lower than the other before the correction. Under this situation, the accuracy of the photographer probability is low.

In the operation S75, furthermore, based on the shooting mode factor acquired in the operation S74, it is preferable to perform a second correction process on the photographer probability based on the photographer mode factor acquired in the operation S74. The second correction process removes the image of interest substantially from targets from which photographers of the respective images are estimated when the shooting mode factor is "0", or when the image of interest is one obtained by remote control or timer control. When the image of interest is not obtained by remote control or timer control, the second correction process is substantially not performed. More specifically, in the second correction process, the photographer probability before the correction, which is calculated by the aforementioned equation (E1), is corrected to the following equation (E2).

$$\text{Photographer probability after second correction} = \text{photographer probability before correction} \times \text{shooting mode factor} \quad (E2)$$

In this second correction process, the photographer probability is "0" when the image of interest is obtained by remote control or timer control. Thus, the image of interest is substantially removed from targets from which photographers of the respective images are estimated. This process is performed on the grounds that, when an image is obtained by remote control or time control, there is no need for providing feedback about a shooting technique or the like to the photographer of the image. Accordingly, the procedure in the operation S75 is performed as described above.

When the photographer probabilities of individuals for the image of interest are calculated, the person with the highest photographer probability is estimated as a photographer and the photographer and the photographer probability are associated with the image of interest and recorded in the photographer information 110 (OPERATION S76). FIG. 14 is a diagram illustrating exemplary photographer information 110. In the example illustrated in FIG. 14, the specified photographer and the photographer probability thereof are recorded for every image file. Here, when the highest photographer probability among the photographer probabilities of individuals for the image of interest is smaller than the predetermined threshold, the corresponding blank in the table may be filled with "unknown" instead of recording the nominal designation of the photographer. This is because, when all the photographer probabilities of individuals for the image of interest are not so high, the reliability of photographer estimation may be low. In addition, as illustrated in FIG. 14, when the image of interest is obtained by remote control or time control, in other words, when the shooting mode factor=0, the photographer may be recorded as "automatic" in the table.

Figure 15:
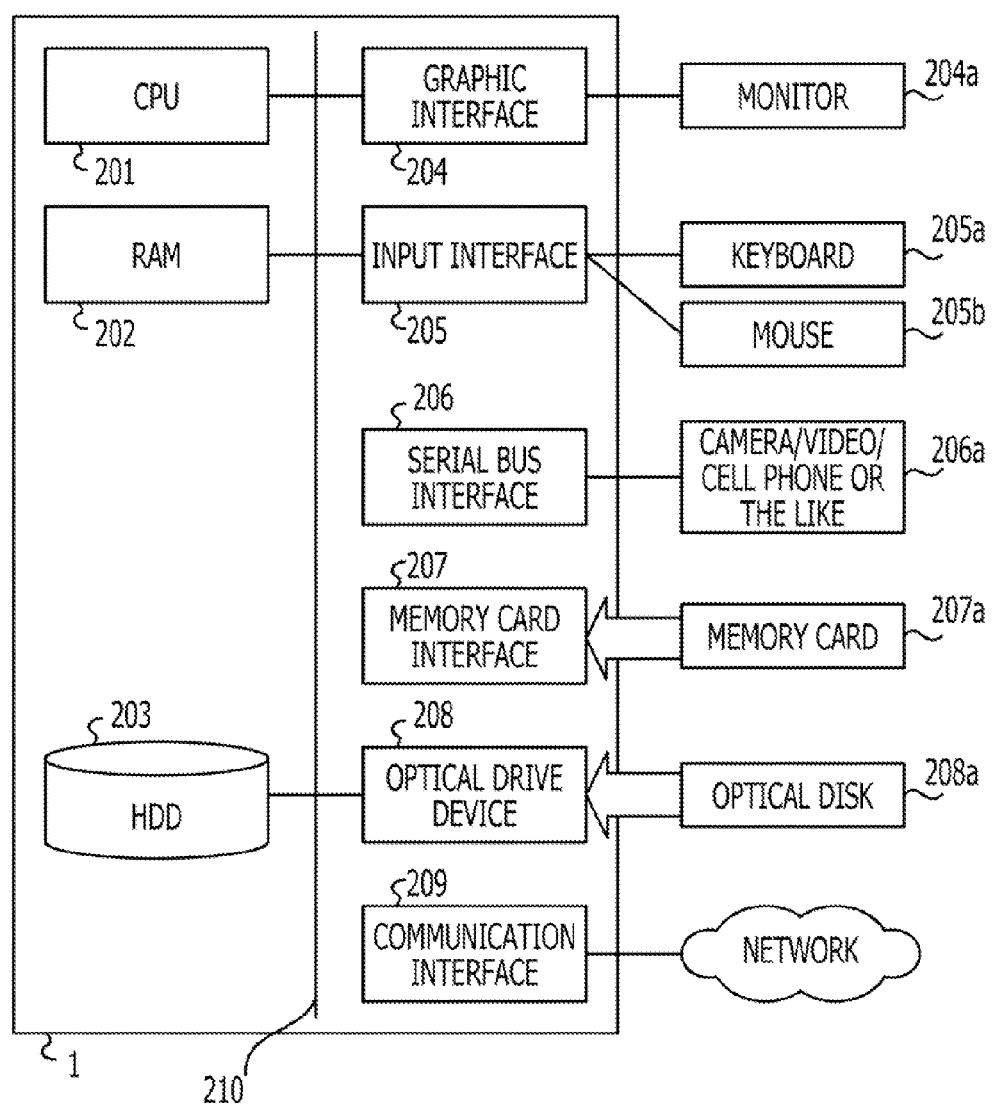
FIG. 15 is a diagram illustrating an exemplary hardware configuration of the information processing apparatus of the embodiment.

FIG. 15 is a diagram illustrating an exemplary hardware configuration of an information processing apparatus 1.

The information processing apparatus 1 employs a CPU 201 to control the entire apparatus. The CPU 201 is connected to a random access memory (RAM) 202 and peripheral devices through a bus 210. The RAM 202 is used as a main storage unit of the information processing apparatus 1.

The RAM 202 temporarily stores an operation system program (OS) and at least some application programs. In addition, the RAM 202 stores various kinds of data required for processing in the CPU 201.

The peripheral devices connected to a bus 210 may include a hard disk drive (HDD) 203, a graphical interface (I/F) 204, an input interface (I/F) 205, a serial bus interface (I/F) 206, a memory card slot 207, an optical drive unit 208, and a communication interface 209.

The HDD 203 writes and reads data magnetically on/from a built-in magnetic disk. The HDD 203 is used as a secondary storage device of the information processing apparatus 1.

The HDD 203 stores an OS program, application programs, and various kinds of data. Alternatively, a semiconductor storage, such as a flash memory, may be used as a secondary storage device.

The graphic interface 204 is connected to a monitor 204a. The graphic interface 204 displays an image on the screen of the monitor 204a in response to a command from the CPU 201. The monitor 204a is a liquid crystal display, for example.

The input interface 205 is connected to, for example, a keyboard 205a and a mouse 205b. The input interface 205 transmits output signals from the keyboard 205a and the mouse 205b. Here, the mouse 205b is an example of a pointing device. Alternatively, any other pointing device may be used. Examples of other pointing devices include a touch panel, a tablet, a touchpad, and a trackball.

The serial bus interface 206 is connected to a device 206a, such as a camera, a video, or a cell phone. The serial bus interface 206 transmits an output signal from the device 206a, such as a camera, a video, or a cell phone, to the CPU 201. Here, the serial bus interface 206 generally used is a universal serial bus interface (USB).

The memory card interface 207 is connected to a memory card 207a, which is a portable storage device using a flash memory, as a storage device. The memory card interface 207 reads data from the memory card 207a and outputs the data to the CPU 201. Furthermore, the memory card interface 207 writes data on the memory card 207a in response to a writing request from the CPU 201.

The optical drive device 208 reads the data recorded in an optical disk 208a using a laser beam or the like. The optical disk 208a is a portable recording medium in which data is recorded in a form readable by reflection of light. Examples of the optical disk 206 include a digital versatile disc (DVD), DVD-RAM, a compact disc read only memory (CD-ROM), and a compact disc readable/rewritable (CD-R/RW).

The communication interface 209 communicates with other devices by wire or wireless connection. Examples of the wire connection include a universal serial bus (USB) connection. Examples of the wireless connection include Bluetooth.

The embodiments of the present invention have been described in detail. However, it is appreciated that the information processing apparatus and the information processing method of the present invention are not limited to those of the above embodiments and various modifications and changes may be easily attained without departing from the gist of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus that estimates a photographer of an image, comprising:
   a first database in which an imaging device is previously associated with an owner of the imaging device among a plurality of persons;
   a second database in which the persons are previously associated with their respective personal images;
   a first determining unit to acquire information about the imaging device associated with an image of interest to be served as an object to be estimated as a photographer, to specify the owner associated with the acquired information about the imaging device with reference to the first database to obtain owner information, and to acquire a first value that represents a probability that each of the plurality of persons is a photographer of the image of interest, based on the owner information;
   a second determining unit to acquire a second value that represents a probability that each of the plurality of persons is a photographer of the image of interest, based on a result of making a comparison between a subject image included in the image of interest and each personal image in the second database; and
   a third determining unit to acquire a third value that represents a probability that each of the plurality of persons is a photographer of the image of interest.

2. The information processing apparatus according to claim 1, wherein when a plurality of the images of interest are present and when a difference between shooting times of any two images of interest among the plurality of the images of interest is smaller than a predetermined threshold and the two images of interest are associated with the same imaging apparatus, the third determining unit corrects the third values for the two images of interest so that the third values become the larger of two values obtained based on the first and second values.

3. The information processing apparatus according to claim 1, wherein when the image of interest is obtained by remote control or timer control of the imaging device, the third determining unit substantially eliminates the image of interest from objects for estimating a photographer.

4. The information processing apparatus according to claim 1, wherein the third determining unit estimates, when a highest value among the third values of the respective persons is not less than a predetermined threshold, a person corresponding to the highest value as a photographer of the image of interest.

5. A method for information processing to be executed by an information processing apparatus, comprising:
   acquiring information about an imaging device associated with an image of interest to be served as an object to be estimated as a photographer;
   specifying an owner associated with the acquired information about the imaging device with reference to a first database to obtain owner information;
   acquiring a first value that represents a probability that each of a plurality of persons is a photographer of the image of interest, based on the owner information;
   allowing the first database to previously associate the imaging device with an owner of the imaging device among the plurality of persons;
   acquiring a second value that represents a probability that each of the plurality of persons is a photographer of the image of interest, based on a result of making a comparison between a subject image included in the image of interest and each personal image in a second database;
   allowing the second database to previously associate the persons with their respective personal images; and based on the first and second values, acquiring a third value that represents a probability that each of the plurality of persons is a photographer of the image of interest.

6. The information processing method according to claim 5, wherein when a plurality of the images of interest are present and when a difference between shooting times of any two images of interest among the plurality of the images of interest is smaller than a predetermined threshold and the two images of interest are associated with the same imaging apparatus, the third value for the two images of interest is corrected so that the third value becomes the larger value of two values obtained based on the first and second values.

7. The information processing method according to claim 5, wherein when the image of interest is obtained by remote control or timer control of the imaging device, the third determining unit substantially eliminates the image of interest from objects for estimating a photographer.

8. The information processing method according to claim 5, wherein when the highest value among the third values of the respective persons is not less than a predetermined threshold, a person corresponding to the highest value is a photographer of the image of interest.

* * * * *